WOOD, WELLS & BATES.
Cultivator.
No. 2,647.
Patented May 28, 1842
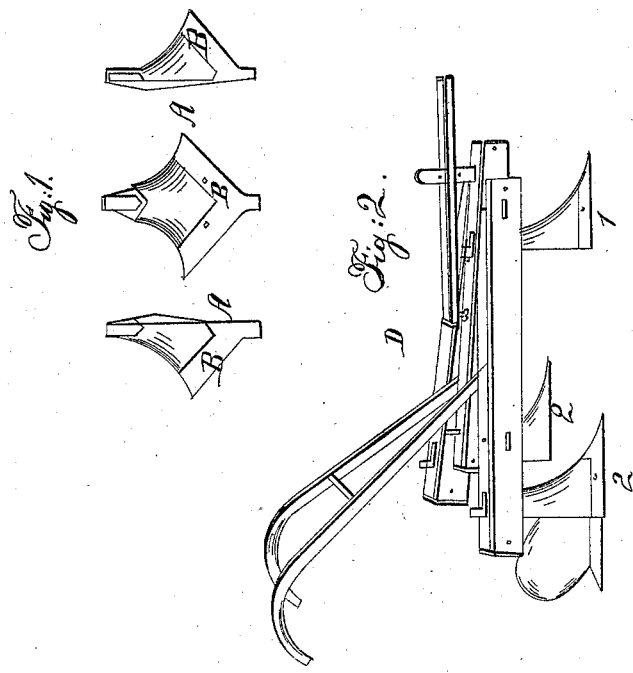

UNITED STATES PATENT OFFICE.

ASA WOOD, DAVID WELLS, AND ISSACHAR BATES, OF ADAMS, N. Y.

IMPROVEMENT IN CULTIVATORS.

Specification forming part of Letters Patent No. 2,647, dated May 28, 1842.

*To all whom it may concern:*

Be it known that we, ASA WOOD, DAVID WELLS, and ISSACHAR BATES, of Adams, in the county of Jefferson and State of New York, have invented a new and useful Improvement on a Machine Called the "Corn-Cultivator;" and we do hereby declare that the following is a full, clear, and exact description of the construction and operation of the same, reference being had to the annexed drawing, making a part of this specification.

The improvement which we have made upon the common corn-cultivator, and for which we ask Letters Patent, consists of the combination of three cultivator-teeth of the form hereinafter described, and arranged according to the following description, to be used in the ordinary cultivator-frames.

The hind teeth (marked upon the annexed drawing as No. 2) are made of cast-iron in the form of an iron plow, with landside, mold-board, and false point, to be so used that they may turn the furrow inward—that is, toward each other—or outward—that is, from each other—by changing the teeth from side to side. The fore tooth is to be also made of cast-iron, and differs from the hind teeth in these particulars: that as the hind teeth each have a landside and mold-board and false point, the fore tooth is made in the form of No. 1 in the annexed drawing, with double mold-board and false point that cuts and turns the furrow each way.

In using this improved cultivator for the first dressing of corn the two back teeth are set to turn the furrows inward—that is, from the corn—and at the second dressing the hind teeth are set to turn the furrow outward—that is, toward the corn. Each tooth is made in two separate pieces, or with false points, fastened with bolts, so that when the tooth becomes dull from use the tooth can be removed and another put in its place.

Be it known that we do not claim, and we hereby disclaim, any pretensions to an improvement in the corn-cultivator frames, basing our claim upon the combination of three teeth of the afore-mentioned description to be used in the corn-cultivator frame.

ISSACHAR BATES.
ASA WOOD.
DAVID WELLS.

Witnesses:
C. WARD WRIGHT,
W. C. THOMPSON.